United States Patent
Shin et al.

(10) Patent No.: US 11,097,228 B2
(45) Date of Patent: Aug. 24, 2021

(54) ACID-RESISTANT NANO-SEPARATION MEMBRANE HAVING ENHANCED FLOW RATE, AND METHOD FOR MANUFACTURING SAME

(71) Applicant: TORAY ADVANCED MATERIALS KOREA INC., Gumi-si (KR)

(72) Inventors: Hong Sub Shin, Gumi-si (KR); Yong Doo Jung, Gumi-si (KR)

(73) Assignee: TORAY ADVANCED MATERIALS KOREA INC., Gyeongsangbuk-do (KR)

(*) Notice: Subject to any disclaimer, the term of this patent is extended or adjusted under 35 U.S.C. 154(b) by 0 days.

(21) Appl. No.: 16/497,173

(22) PCT Filed: Mar. 23, 2018

(86) PCT No.: PCT/KR2018/003414
§ 371 (c)(1),
(2) Date: Sep. 24, 2019

(87) PCT Pub. No.: WO2018/174626
PCT Pub. Date: Sep. 27, 2018

(65) Prior Publication Data
US 2020/0094196 A1  Mar. 26, 2020

(30) Foreign Application Priority Data
Mar. 24, 2017  (KR) .................. 10-2017-0037649

(51) Int. Cl.
| | | |
|---|---|---|
| B01D 71/56 | (2006.01) | |
| B01D 61/02 | (2006.01) | |
| B01D 67/00 | (2006.01) | |
| B01D 69/02 | (2006.01) | |
| B01D 69/10 | (2006.01) | |
| B01D 71/58 | (2006.01) | |
| B01D 69/12 | (2006.01) | |

(52) U.S. Cl.
CPC .............. B01D 71/56 (2013.01); B01D 61/02 (2013.01); B01D 61/027 (2013.01); B01D 67/0006 (2013.01); B01D 69/02 (2013.01); B01D 69/10 (2013.01); B01D 69/125 (2013.01); B01D 71/58 (2013.01); B01D 2323/02 (2013.01); B01D 2325/36 (2013.01)

(58) Field of Classification Search
CPC .... B01D 61/02; B01D 61/027; B01D 67/006; B01D 69/02; B01D 69/10; B01D 71/56; B01D 71/58; B01D 2325/36; B01D 67/0006; B01D 69/125; B01D 71/60; B01D 71/76; B01D 2323/02; B01D 2325/22; B01D 2325/30
See application file for complete search history.

(56) References Cited

U.S. PATENT DOCUMENTS

| | | | | |
|---|---|---|---|---|
| 5,152,901 | A | * | 10/1992 | Hodgdon ............. B01D 69/125 210/490 |
| 2007/0175821 | A1 | * | 8/2007 | Koo ................... B01D 67/0093 210/500.38 |
| 2012/0111791 | A1 | | 5/2012 | Freeman et al. |
| 2016/0243503 | A1 | * | 8/2016 | Okabe ................ B01D 67/0006 |

FOREIGN PATENT DOCUMENTS

| | | | |
|---|---|---|---|
| CN | 103894073 | 7/2014 | |
| CN | 104258743 | 1/2015 | |
| CN | 105085929 | 11/2015 | |
| CN | 105611994 | 5/2016 | |
| JP | S 55134607 | 10/1980 | |
| JP | S 62269705 | 11/1987 | |
| JP | S 63178806 | 7/1988 | |
| JP | 2008093543 | 4/2008 | |
| JP | 2013535319 | 9/2013 | |
| JP | 2015180495 | 10/2015 | |
| KR | 1020110007761 | 1/2011 | |
| WO | WO 99/16814 | 4/1999 | |
| WO | WO-2015046582 A1 * | 4/2015 | ............. B01D 71/38 |

OTHER PUBLICATIONS

Abolfazli et al., "Fabrication and Modification of Thin-film Composite Hollow Fiber NF Membranes" Journal of Membrane Science & Research 2017, 3, 42-49.
Chiang et al., "Nanofiltration Membranes Synthesized from Hyperbranched Polyethyleneimine" Journal of Membrane Science 2009, 326, 19-26.
International Search Report and Written opinion for PCT/KR2018/003414 prepared by Korean Intellectual Property Office, dated Feb. 13, 2019.
Jayarani et al., "Thin-film Composite Poly(esteramide)-based Membranes" Desalination 2000, 130, 17-30.
Muntha et al., "Advances in Polymeric Nanofiltration Membrane: A Review" Polymer-Plastics Technology and Engineering 2017, 56 (8), 841-856.
Yalcinkaya et al., "Thin Film Nanofibrous Composite Membrane for Dead-end Seawater Desalination" Journal of Nanomaterials 2016, 2016, 1-12.
Extended European Search Report Issued in Corresponding European Patent No. 18771521.4, dated Nov. 16, 2020.
Gohil, et al., "A Review on Semi-Aromatic Polyamide TFC Membranes Prepared by Interfacial Polymerization: Potential for Water Treatment and Desalination," Separation and Purification Technology, 181: 159-182, 2017.

(Continued)

Primary Examiner — James C Goloboy
(74) Attorney, Agent, or Firm — Norton Rose Fulbright US LLP

(57) ABSTRACT

The present invention relates to an acid-resistant nanomembrane with an improved flow rate and a method of producing the acid-resistant nanomembrane, and more particularly, to an acid-resistant nanomembrane with an improved flow rate, which can also be used under strong-acid and high-temperature conditions for the recovery of rare metals, valuable metals, and the like generated in a smelting process and which exhibits both excellent flow rate and excellent acid resistance, and a method of producing the acid-resistant nanomembrane.

11 Claims, No Drawings

(56) References Cited

OTHER PUBLICATIONS

Office Action Issued in Corresponding Japanese Patent Application No. 2019552471, dated Dec. 12, 2020.
Office Action issued in Corresponding Chinese Application No. 201880027083, dated May 20, 2021 (English Translation provided).

* cited by examiner

ACID-RESISTANT NANO-SEPARATION MEMBRANE HAVING ENHANCED FLOW RATE, AND METHOD FOR MANUFACTURING SAME

CROSS-REFERENCE TO RELATED APPLICATIONS

This application is a national phase application under 35 U.S.C. § 371 of International Application No. PCT/KR2018/003414, filed Mar. 23, 2018, which claims priority to and the benefit of Korean Patent Application No. 10-2017-0037649, filed Mar. 24, 2017. The contents of the referenced patent applications are incorporated into the present application by reference.

FIELD OF DISCLOSURE

The present invention relates to an acid-resistant nanomembrane with an improved flow rate and a method of producing the acid-resistant nanomembrane, and more particularly, to an acid-resistant nanomembrane with an improved flow rate, which can also be used under strong-acid and high-temperature conditions for the recovery of rare metals, valuable metals, and the like generated in a smelting process and which exhibits both an excellent flow rate and excellent acid resistance, and a method of producing the acid-resistant nanomembrane.

DESCRIPTION OF RELATED ART

Metal-containing wastewater includes mine wastewater, chemical plant wastewater, smelter wastewater, steel mill wastewater, plating plant wastewater, garbage incinerator wastewater, and the like. Among these, the electroplating plant wastewater generated from steel mills has a low pH of 2 to 4 and in many cases contains, depending on the type of plating, a combination of metal ions such as nickel, zinc, tin, chromium, and copper ions as well as iron (II) ions. Since these metal ions are subjected to wastewater regulations as hazardous metals, it is required that they are removed to or below regulation standards prior to discharge. However, if such metal ions can be separated and recovered as metals, they will be able to create value as resources. In addition, in some cases, the plating plant wastewater and the like may contain organic substances such as surfactants or plating additives and thus require additional chemical oxygen demand (COD) treatment.

Hereinafter, conventional plating wastewater treatment methods will be described.

A Neutralization-flocculation-sedimentation method is a representative plating wastewater treatment method being conventionally widely used. In this method, the pH of the wastewater is increased to a pH of 9 to 10 by adding an inexpensive alkaline agent such as calcium hydroxide thereto, so that the metal ions contained in the wastewater are converted to a hydroxide and are separated through gravitational settling in a sedimentation tank or the like. At the pH of 9 to 10, since the solubility of iron ions, nickel ions, zinc ions, and the like is decreased, these ions are converted to a hydroxide. However, such a pH-controlled precipitation method results in the generation of chemical sludge containing various metal ions, which cannot be recycled and is classified as special waste and thus is disposed of by landfilling or the like as prescribed by law.

Other electroplating wastewater treatment methods include a sulfide precipitation method, an ion-exchange resin method, a chelating resin method, a membrane separation method, a solvent extraction method, a bioaccumulation method, an activated carbon method, and the like.

Among those listed above, the membrane separation method is widely used for seawater desalination, plant wastewater recycling, or the like because it allows only the solvent to be transferred through the membrane using osmotic pressure, so that clean and clear treated water can be obtained. However, in this case, a solution in which salts are highly concentrated is obtained at the same time. In addition, it requires the cumbersome cleaning or pretreatment of the membrane and high-pressure. In principle, the membrane separation method does not allow the selective separation and concentration of specific metal ions.

In addition, there are cases where the membrane separation method is applied to plating wastewater recycling, in which case, it is possible to remove not only heavy metals but also inorganic ions and the like from the raw water, so that the membrane-permeated water can be recycled as industrial water. However, a small amount of a concentrated liquid is generated at the same time, which is difficult to recycle due to containing various heavy metal ions and inorganic ions, and severe use conditions such as high-temperature, high-pressure, and strong-acid conditions lead to high maintenance costs.

Therefore, in order to recover rare metals and valuable metals from the above-described wastewater, there is a need to develop an acid-resistant membrane that can be used under strong-acid and high-temperature conditions.

Meanwhile, conventionally, acid-resistant nanomembranes were produced by forming a sulfone amide layer by introducing a sulfonyl halide into an aqueous amine solution. Although the nanomembranes were applicable to a process generating acidic wastewater, such as in the smelting industry, where acid resistance is required, they were difficult to use under strong-acid and high-temperature conditions for the recovery of rare metals, valuable metals, and the like generated in a smelting process or did not exhibit an excellent flow rate and excellent acid resistance at the same time.

SUMMARY OF THE INVENTION

The present invention was designed to solve the above-described problems of the related art, and is directed to providing an acid-resistant nanomembrane with an improved flow rate, which can also be used under strong-acid and high-temperature conditions for the recovery of rare metals, valuable metals, and the like generated in a smelting process and which exhibits both an excellent flow rate and excellent acid resistance, and a method of producing the acid-resistant nanomembrane.

In order to achieve the above-described objective, one aspect of the present invention provides a method of producing an acid-resistant nanomembrane with an improved flow rate, the method including the steps of: immersing a porous support in a first solution containing a first amine-based compound, a second amine-based compound, and a phenol-based compound, wherein the first amine-based compound includes a compound represented by Chemical Formula 1; forming a polyamide layer on the surface of the immersed porous support by treating the porous support with a second solution containing an acid halide compound; and subjecting the porous support, on which the polyamide layer has been formed, to hydrophilization.

[Chemical Formula 1]

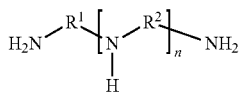

In Chemical Formula 1, $R^1$ and $R^2$ are each independently a $C_1$-$C_{10}$ alkylene group, and n is an integer of 1 to 100.

According to a preferred embodiment of the present invention, in Chemical Formula 1, $R^1$ and $R^2$ may be each independently a $C_2$-$C_6$ linear alkylene group or a $C_2$-$C_6$ branched alkylene group, and n may be an integer of 1 to 10.

According to another preferred embodiment of the present invention, the phenol-based compound may include one or more selected from the group consisting of pyrocatechol, resorcinol, hydroquinone, pyrogallol, and phloroglucinol.

According to still another preferred embodiment of the present invention, the second amine-based compound may include one or more selected from the group consisting of m-phenylenediamine and piperazine.

According to yet another preferred embodiment of the present invention, the first solution may contain the first amine-based compound, the second amine-based compound, and the phenol-based compound in a weight ratio of 1:0.04 to 2:0.02 to 1.

According to yet another preferred embodiment of the present invention, the first solution may contain a hydrophilic polymer in an amount of 0.4 to 40 parts by weight based on 100 parts by weight of the first amine-based compound, wherein the hydrophilic polymer may include one or more selected from the group consisting of polyvinylpyrrolidone, polyethylene glycol, and polyvinyl alcohol.

According to yet another preferred embodiment of the present invention, the acid halide compound may include one or more selected from among isophthaloyl chloride, trimesoyl chloride, and terephthaloyl chloride.

According to yet another preferred embodiment of the present invention, the hydrophilization may be carried out using a 0.01 to 2% hydrophilization solution.

According to yet another preferred embodiment of the present invention, the hydrophilization solution may contain one or more selected from the group consisting of potassium hydroxide, calcium hydroxide, magnesium hydroxide, sodium hydroxide, sulfuric acid, sodium sulfate, sodium sulfite, and sodium bicarbonate.

According to yet another preferred embodiment of the present invention, the hydrophilization may be carried out at a temperature of 10 to 90° C. for 0.1 to 5 minutes.

According to yet another preferred embodiment of the present invention, the porous support may include a nonwoven fabric and a porous polymer layer, wherein the porous polymer layer may have an average thickness of 10 to 200 μm, and may be formed to include one or more selected from the group consisting of polysulfone, polyethersulfone, polyimide, polypropylene, and polyvinylidene fluoride.

In addition, in order to achieve the above-described objective, another aspect of the present invention provides an acid-resistant nanomembrane with an improved flow rate, which includes: a porous support; and a polyamide layer, which is provided on the surface of the porous support and formed by the interfacial polymerization between a first solution containing a first amine-based compound, a second amine-based compound, and a phenol-based compound and a second solution containing an acid halide compound, wherein the first amine-based compound includes a compound represented by Chemical Formula 1, and wherein the polyamide layer has a hydrophilically modified surface.

[Chemical Formula 1]

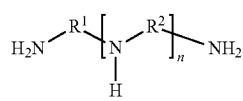

In Chemical Formula 1, $R^1$ and $R^2$ are each independently a $C_1$-$C_{10}$ alkylene group, and n is an integer of 1 to 100.

According to a preferred embodiment of the present invention, the polyamide layer may have an average thickness of 0.05 to 1 μm, and the porous support may include a nonwoven fabric having an average thickness of 30 to 300 μm and a porous polymer layer having an average thickness of 10 to 200 μm, wherein the porous polymer layer may be formed to include one or more selected from the group consisting of polysulfone, polyethersulfone, polyimide, polypropylene, and polyvinylidene fluoride.

According to another preferred embodiment of the present invention, the nanomembrane may exhibit a flow rate of 25 GFD or more and a salt removal rate of 90% or more at 25° C. and 75 psi.

According to still another preferred embodiment of the present invention, the nanomembrane may exhibit a flow rate of 30 GFD or more and a salt removal rate of 85% or more at 25° C. and 75 psi when immersed in a 15 wt % aqueous sulfuric acid solution for 30 days.

In addition, in order to achieve the above-described objective, still another aspect of the present invention provides a membrane module, which includes the above-described nanomembrane.

The acid-resistant nanomembrane of the present invention, which has an improved flow rate and is produced by the method of the present invention, can also be used under strong-acid and high-temperature conditions for the recovery of rare metals, valuable metals, and the like generated in a smelting process and exhibits both an excellent flow rate and excellent acid resistance.

DETAILED DESCRIPTION OF THE INVENTION

Hereinafter, the present invention will be described in more detail.

As described above, conventionally, acid-resistant nanomembranes were produced by forming a sulfone amide layer by introducing a sulfonyl halide into an aqueous amine solution. Although the nanomembranes were applicable to a process generating acidic wastewater, such as in the smelting industry, where acid resistance is required, they were difficult to use under strong-acid and high-temperature conditions for the recovery of rare metals, valuable metals, and the like generated in a smelting process or did not exhibit an excellent flow rate and excellent acid resistance at the same time.

Hence, the present invention sought to solve the above-described problem by providing a method of producing an acid-resistant nanomembrane with an improved flow rate, the method including the steps of: immersing a porous support in a first solution containing a specific compound; forming a polyamide layer on the surface of the immersed porous support by treating the porous support with a second solution containing an acid halide compound; and subjecting the porous support, on which the polyamide layer has been formed, to hydrophilization.

In this way, it is possible to achieve the objective of providing a nanomembrane that can also be used under strong-acid and high-temperature conditions for the recovery of rare metals, valuable metals, and the like generated in a smelting process and exhibit both an excellent flow rate and excellent acid resistance.

First, the step of immersing a porous support in a first solution containing a specific compound will be described.

In the step of immersing a porous support in a first solution, the porous support is immersed in the first solution so that a polyamide layer can be formed on the surface of the porous support as a result of treatment with a second solution containing an acid halide compound in a subsequent step.

Generally, a polyamide nanomembrane can be formed by interfacial polymerization using a material that reacts with a polyfunctional amine, wherein the polyfunctional amine is a polyamine having two to three amine functional groups per monomer and is a primary amine or a secondary amine.

The first solution contains a first amine-based compound, a second amine-based compound, and a phenol-based compound.

In order to improve a salt removal rate and acid resistance, the first amine-based compound includes a compound represented by the following Chemical Formula 1.

[Chemical Formula 1]

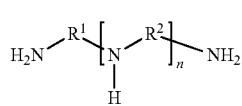

In Chemical Formula 1, $R^1$ and $R^2$ may be each independently a $C_1$-$C_{10}$ alkylene group, and n may be an integer of 1 to 100, and preferably, $R^1$ and $R^2$ are each independently a $C_2$-$C_6$ linear alkylene group or a $C_2$-$C_6$ branched alkylene group, and n is an integer of 1 to 10.

In addition, the second amine-based compound may be used without limitation as long as it is a material typically capable of improving a salt removal rate, and it preferably includes one or more selected from the group consisting of m-phenylenediamine and piperazine, and it is more preferable that piperazine is used in terms of improving the salt removal rate.

In addition, the phenol-based compound may be used without limitation as long as it is a material typically capable of improving the flow rate, and it preferably includes one or more selected from the group consisting of pyrocatechol, resorcinol, hydroquinone, pyrogallol, and phloroglucinol, and it more preferably includes one or more selected from the group consisting of pyrocatechol, resorcinol, and hydroquinone, and it is even more preferable that resorcinol is used in terms of significantly improving the flow rate. Due to the inclusion of the phenol-based compound, the surface of the polyamide layer to be subsequently formed can be hydrophilically modified so that the flow rate can be improved.

Meanwhile, the first solution may contain the first amine-based compound, the second amine-based compound, and the phenol-based compound in a weight ratio of 1:0.04 to 2:0.02 to 1 and preferably 1:0.06 to 1.6:0.04 to 0.8.

When the weight ratio of the first amine-based compound and the second amine-based compound is less than 1:0.04, the salt removal rate may be significantly lowered, and when the weight ratio is more than 1:2, the flow rate may be adversely affected. In addition, when the weight ratio of the first amine-based compound and the phenol-based compound is less than 1:0.02, the effect of improving the flow rate may be insignificant, and when the weight ratio is more than 1:1, the salt removal rate and the acid resistance may be significantly lowered.

Meanwhile, the first solution may contain a hydrophilic polymer.

The hydrophilic polymer may be used without limitation as long as it is a hydrophilic polymer that can be commonly used in the art, and it preferably includes one or more selected from the group consisting of polyvinylpyrrolidone, polyethylene glycol, and polyvinyl alcohol, and it is more preferable that polyvinylpyrrolidone is used.

The first solution may contain the hydrophilic polymer in an amount of 0.4 to 40 parts by weight and preferably 1 to 35 parts by weight based on 100 parts by weight of the first amine-based compound. When the hydrophilic polymer is contained in an amount of less than 0.4 part by weight based on 100 parts by weight of the first amine-based compound, the initial flow rate and the acid resistance may be adversely affected, and when the hydrophilic polymer is contained in an amount of more than 40 parts by weight, the salt removal rate and the acid resistance may be adversely affected.

Meanwhile, the porous support may include a nonwoven fabric and a porous polymer layer.

The nonwoven fabric may be used without limitation as long as it is a nonwoven fabric that has specifications commonly acceptable in the art, and it preferably has an average thickness of 30 to 300 µm, and more preferably has an average thickness of 50 to 200 µm, but the present invention is not limited thereto.

In addition, the porous polymer layer may be a porous polymer layer formed of a material that can be commonly used, and it is preferably formed to include one or more selected from the group consisting of polysulfone, polyethersulfone, polyimide, polypropylene, and polyvinylidene fluoride, and may have an average thickness of 10 to 200 µm and preferably 30 to 190 µm, but the present invention is not limited thereto.

Next, the step of forming a polyamide layer on the surface of the immersed porous support by treating the porous support with a second solution containing an acid halide compound will be described.

In the step of forming a polyamide layer, as the porous support has been immersed in the first solution in the above-described step of immersing a porous support in a first solution, since the first solution remaining on the surface reacts with a second solution containing an acid halide compound, a polyamide layer can be formed.

The acid halide compound may be used without limitation as long as it is a material typically capable of forming a polyamide layer, and it is preferably one or more selected from among isophthaloyl chloride, trimesoyl chloride, and terephthaloyl chloride, and it is more preferable that trimesoyl chloride is used. When trimesoyl chloride is used as the acid halide compound, an excellent salt removal rate can be exhibited.

In addition, the second solution may contain the acid halide compound in an amount of 0.005 to 2 wt % and preferably 0.01 to 1 wt % based on the total weight of the second solution. When the acid halide compound is contained in an amount of less than 0.005 wt %, it may be difficult to form a polyamide layer, and when the acid halide compound is contained in an amount of more than 2 wt %, the acid halide compound may be precipitated, making it difficult for the interfacial polymerization to occur.

The step of forming a polyamide layer may include a step of drying. The drying is not particularly limited as long as it is carried out under typical drying conditions, and it is preferably carried out at a temperature of 10 to 100° C. for 0.5 to 20 minutes, and more preferably carried out at a temperature of 15 to 90° C. for 1 to 10 minutes.

Meanwhile, the polyamide layer formed as such may have an average thickness of 0.05 to 1 μm and preferably 0.1 to 900 μm, but the present invention is not limited thereto.

Next, the step of subjecting the porous support, on which the polyamide layer has been formed, to hydrophilization will be described. By carrying out the hydrophilization, it is possible to hydrophilically modify the surface of the polyamide layer so that the flow rate can be further improved.

The hydrophilization solution is not particularly limited as long as it is a material typically capable of hydrophilically modifying the surface of the polyamide layer, and the hydrophilization is preferably carried out using a hydrophilization solution containing an acid or base material, more preferably carried out using a hydrophilization solution containing one or more selected from the group consisting of potassium hydroxide, calcium hydroxide, magnesium hydroxide, sodium hydroxide, sulfuric acid, sodium sulfate, sodium sulfite, and sodium bicarbonate, and most preferably carried out using a hydrophilization solution containing sodium hydroxide in terms of significantly improving the flow rate.

In addition, the hydrophilization may be carried out using a hydrophilization solution having a concentration of 0.01 to 2%, and is preferably carried out using a hydrophilization solution having a concentration of 0.015 to 1.8%. When the concentration of the hydrophilization solution is less than 0.01%, the effect of improving the flow rate may be insignificant, and when the concentration of the hydrophilization solution is more than 2%, the salt removal rate may be lowered due to the disintegration of the polyamide layer.

The hydrophilization may be carried out by immersing the porous support, on which the polyamide layer has been formed, in the hydrophilization solution. The hydrophilization may be carried out at a temperature of 10 to 90° C. for 0.1 to 5 minutes, preferably at a temperature of 15 to 80° C. for 0.2 to 3 minutes. When the hydrophilization is carried out at a temperature of less than 10° C., the effect of improving the flow rate may be insignificant, and when the hydrophilization is carried out at a temperature of more than 90° C., the salt removal rate may be lowered. In addition, when the hydrophilization is carried out for less than 0.1 minute, the effect of improving the flow rate may be insignificant, and when the hydrophilization is carried out for more than 5 minutes, the salt removal rate may be lowered due to the disintegration of the polyamide layer.

Meanwhile, after carrying out the above-described hydrophilization, the porous support, which has been subjected to the hydrophilization, may be immersed in a buffer, whereby unreacted residue can be removed. More specifically, the unreacted residue can be removed by immersing the porous support in a buffer at a water temperature of 10 to 95° C. for 0.5 to 24 hours, preferably at a water temperature of 15 to 90° C. for one to five hours, and then washing the porous support with distilled water.

The buffer may be used without limitation as long as it is a material typically capable of serving as a buffer, and it preferably includes sodium carbonate. In addition, the buffer may contain sodium carbonate in an amount of 0.05 to 0.5 wt % and preferably 0.1 to 0.4 wt % based on the total weight of the buffer, but the present invention is not limited thereto.

Meanwhile, the nanomembrane prepared by the above-described preparation method may have a flow rate of 25 GFD or more and a salt removal rate of 90% or more at 25° C. and 75 psi, and when immersed in a 15 wt % aqueous sulfuric acid solution for 30 days, may have a flow rate of 30 GFD or more and a salt removal rate of 85% or more at 25° C. and 75 psi.

EXAMPLES

Hereinafter, the present invention will be described by way of Examples. However, the following Examples are merely illustrative of the invention and do not limit the scope of the invention thereto.

Example 1

Preparation of Nanomembrane

A 140 μm-thick porous support prepared by casting polysulfone onto a nonwoven fabric having an average thickness of 100 μm was immersed in an aqueous solution (i.e., a first solution) containing a compound represented by Chemical Formula 1 at 1 wt %, resorcinol as a phenol-based compound at 0.35 wt %, piperazine as a second amine-based compound at 0.5 wt %, and polyvinylpyrrolidone as a hydrophilic polymer at 0.05 wt % for 40 seconds, and then the support, on which the first solution was applied to the surface, was immersed in an organic solution (i.e., a second solution) containing trimesoyl chloride as an acid halide compound at 0.02 wt % for one minute, and thereby interfacial polymerization was induced. Subsequently, the resultant was dried at 25° C. for 1.5 minutes to form a polyamide layer on the surface thereof, immersed in an aqueous solution (i.e., a hydrophilization solution) containing sodium hydroxide at a concentration of 0.15% for one minute to carry out hydrophilization, and then immersed in a buffer containing sodium carbonate at 0.2 wt % for two hours to remove acid or unreacted residue therefrom, and thereby an acid-resistant nanomembrane was prepared.

[Chemical Formula 1]

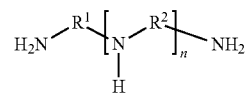

In Chemical Formula 1, $R^1$ and $R^2$ are each independently an ethylene group, and n is 2.

Examples 2 to 24 and Comparative Examples 1 to 8

A nanomembrane was prepared in the same manner as in Example 1, except that conditions including the contents of the first amine-based compound, the second amine-based compound, and the phenol-based compound, the type of the compound represented by Chemical Formula 1, the concentration of the hydrophilization solution, whether or not the hydrophilization was carried out, and the like were varied as shown in Table 1 to Table 6.

Experimental Example 1

Evaluation of Flow Rate, Salt Removal Rate, and Rate of Change in Salt Removal Rate In order to evaluate the performance of the nanomembranes, the permeate flow rate and the salt removal rate of each of the nanomembranes prepared according to Examples 1 to 24 and Comparative Examples 1 to 8 were respectively tested under the conditions of 25° C. and 75 psi in a 2,000 ppm aqueous sodium chloride solution and under the conditions of 25° C. and 75 psi in a 2,000 ppm aqueous magnesium sulfate solution. After 30 days of subsequent immersion in a 15 wt % sulfuric acid solution, the permeate flow rate and the salt removal rate of the nanomembrane were tested in the same manner. In addition, the rate of change in salt removal rate was determined by Equation 1. The results are shown in Table 1 to Table 6.

Rate of change in salt removal rate (%)=Salt removal rate after 30 days of immersion (%)−Initial salt removal rate (%)     [Equation 1]

Experimental Example 2

Evaluation of Contact Angle and Rate of Change in Contact Angle

In order to evaluate the performance of the nanomembranes, each of the nanomembranes prepared according to Examples 1 to 24 and Comparative Examples 1 to 8 was tested using a contact-angle measuring instrument (DSA 100, KRÜSS GmbH). The contact angle was measured using distilled water. After 30 days of subsequent immersion in a 15 wt % sulfuric acid solution, the contact angle was measured in the same manner. In addition, the rate of change in contact angle was determined by Equation 2. The results are shown in Table 1 to Table 6.

Rate of change in contact angle (°)=Contact angle after 30 days of immersion (°)−Initial contact angle(°)     [Equation 2]

TABLE 1

| Classification | | Example 1 | Example 2 | Example 3 | Example 4 | Example 5 | Example 6 |
|---|---|---|---|---|---|---|---|
| First solution | Chemical Formula 1 (n = 2, wt %) | 1 | 1 | 1 | 0.6 | 0.6 | 1 |
| | Chemical Formula 2 (n = 3, wt %) | — | — | — | — | — | — |
| | Second amine-based compound (wt %) | 0.5 | 0.02 | 0.1 | 1 | 1.5 | 0.5 |
| | Phenol-based compound (wt %) | 0.35 | 0.35 | 0.35 | 0.35 | 0.35 | 0.01 |
| Weight ratio of first and second amine-based compounds | | 1:0.5 | 1:0.02 | 1:0.1 | 1:1.67 | 1:2.5 | 1:0.5 |
| Weight ratio of first amine-based compound and phenol-based compound | | 1:0.35 | 1:0.35 | 1:0.35 | 1:0.58 | 1:0.58 | 1:0.01 |
| Second solution | $H_2SO_4$ (concentration in %) | — | — | — | — | — | — |
| | NaOH (concentration in %) | 0.15 | 0.15 | 0.15 | 0.15 | 0.15 | 0.15 |
| Initial | Flow rate (GFD) | 32.7 | 34.3 | 28.2 | 26.6 | 21 | 23.1 |
| | Salt removal rate (%) | 98.4 | 88.6 | 91.7 | 98.9 | 99.1 | 98.7 |
| | Contact angle (°) | 39 | 38 | 41 | 40 | 43 | 45 |
| 30 days later | Flow rate (GFD) | 39.7 | 40.3 | 38.3 | 39.2 | 24.9 | 27.3 |
| | Salt removal rate (%) | 95.1 | 82.5 | 94.3 | 95.3 | 89.2 | 96.3 |
| | Contact angle (°) | 35 | 30 | 34 | 34 | 38 | 39 |
| Rate of change in salt removal rate (%) | | −3.3 | −6.1 | −3.4 | −3.6 | −9.9 | −2.4 |
| Rate of change in contact angle (°) | | −4 | −8 | −7 | −6 | −5 | −6 |

TABLE 2

| Classification | | Example 7 | Example 8 | Example 9 | Example 10 | Example 11 | Example 12 |
|---|---|---|---|---|---|---|---|
| First solution | Chemical Formula 1 (n = 2, wt %) | 1 | 0.55 | 0.62 | 0.3 | 0.5 | 2.5 |
| | Chemical Formula 2 (n = 3, wt %) | — | — | — | — | — | — |
| | Second amine-based compound (wt %) | 0.5 | 0.5 | 0.5 | 1 | 0.5 | 0.5 |
| | Phenol-based compound (wt %) | 0.05 | 0.5 | 0.8 | 0.35 | 0.35 | 0.35 |
| Weight ratio of first and second amine-based compounds | | 1:0.5 | 1:0.9 | 1:0.8 | 1:3.3 | 1:1 | 1:0.2 |
| Weight ratio of first amine-based compound and phenol-based compound | | 1:0.05 | 1:0.9 | 1:1.3 | 1:1.17 | 1:0.7 | 1:0.14 |
| Second solution | $H_2SO_4$ (concentration in %) | — | — | — | — | — | — |
| | NaOH (concentration in %) | 0.15 | 0.15 | 0.15 | 0.15 | 0.15 | 0.15 |
| Initial | Flow rate (GFD) | 25.3 | 39.4 | 44.7 | 28.4 | 27.2 | 26.5 |
| | Salt removal rate (%) | 99 | 90.1 | 77.6 | 89.2 | 98.1 | 98.6 |
| | Contact angle (°) | 43 | 38 | 35 | 40 | 42 | 49 |
| 30 days later | Flow rate (GFD) | 36.4 | 52.1 | 60.3 | 36.6 | 34.7 | 31.3 |
| | Salt removal rate (%) | 96.8 | 85.5 | 66.1 | 72.7 | 91.5 | 93.8 |
| | Contact angle (°) | 35 | 25 | 20 | 26 | 39 | 46 |
| Rate of change in salt removal rate (%) | | −2.2 | −4.6 | −11.5 | −16.5 | −6.6 | −4.8 |
| Rate of change in contact angle (°) | | −8 | −13 | −15 | −14 | −3 | −3 |

TABLE 3

| | Classification | Example 13 | Example 14 | Example 15 | Example 16 | Example 17 | Example 18 |
|---|---|---|---|---|---|---|---|
| First solution | Chemical Formula 1 (n = 2, wt %) | 3 | 1 | 1 | 1 | 1 | 1 |
| | Chemical Formula 2 (n = 3, wt %) | — | — | — | — | — | — |
| | Second amine-based compound (wt %) | 0.1 | 0.5 | 0.5 | 0.5 | 0.5 | 0.5 |
| | Phenol-based compound (wt %) | 0.05 | 0.35 | 0.35 | 0.35 | 0.35 | 0.35 |
| Weight ratio of first and second amine-based compounds | | 1:0.03 | 1:0.5 | 1:0.5 | 1:0.5 | 1:0.5 | 1:0.5 |
| Weight ratio of first amine-based compound and phenol-based compound | | 1:0.017 | 1:0.35 | 1:0.35 | 1:0.35 | 1:0.35 | 1:0.35 |
| Second solution | $H_2SO_4$ (concentration in %) | — | — | — | — | — | 000.5 |
| | NaOH (concentration in %) | 0.15 | 0.005 | 0.015 | 1.8 | 2.5 | — |
| Initial | Flow rate (GFD) | 14.8 | 23.1 | 30.3 | 37.6 | 43.2 | 23.6 |
| | Salt removal rate (%) | 99.4 | 98.7 | 98.5 | 90.3 | 87 | 98.5 |
| | Contact angle (°) | 62 | 41 | 40 | 36 | 33 | 42 |
| 30 days later | Flow rate (GFD) | 18.8 | 28.8 | 38.9 | 42.8 | 47.7 | 29.1 |
| | Salt removal rate (%) | 98.5 | 94.7 | 94.2 | 86 | 79 | 91 |
| | Contact angle (°) | 59 | 35 | 35 | 31 | 23 | 37 |
| Rate of change in salt removal rate (%) | | −0.9 | −4 | −4.3 | −4.3 | −8 | −7.5 |
| Rate of change in contact angle (°) | | −3 | −6 | −5 | −5 | −10 | −5 |

TABLE 4

| | Classification | Example 19 | Example 20 | Example 21 | Example 22 | Example 23 | Example 24 |
|---|---|---|---|---|---|---|---|
| First solution | Chemical Formula 1 (n = 2, wt %) | 1 | 1 | 1 | — | — | — |
| | Chemical Formula 2 (n = 3, wt %) | — | — | — | 0.3 | 1.5 | 3 |
| | Second amine-based compound (wt %) | 0.5 | 0.5 | 0.5 | 1 | 0.5 | 0.1 |
| | Phenol-based compound (wt %) | 0.35 | 0.35 | 0.35 | 0.35 | 0.35 | 0.05 |
| Weight ratio of first and second amine-based compounds | | 1:0.5 | 1:0.5 | 1:0.5 | 1:3.3 | 1:0.33 | 1:0.03 |
| Weight ratio of first amine-based compound and phenol-based compound | | 1:0.35 | 1:0.35 | 1:0.35 | 1:1.17 | 1:0.23 | 1:0.017 |
| Second solution | $H_2SO_4$ (concentration in %) | 0.015 | 1.8 | 2.5 | — | — | — |
| | NaOH (concentration in %) | — | — | — | 0.15 | 0.15 | 0.15 |
| Initial | Flow rate (GFD) | 27.3 | 31.1 | 41.7 | 45.5 | 38.4 | 35.5 |
| | Salt removal rate (%) | 98.6 | 93.5 | 88.7 | 93.6 | 94.1 | 97.6 |
| | Contact angle (°) | 40 | 38 | 33 | 43 | 44 | 47 |
| 30 days later | Flow rate (GFD) | 42.5 | 42.1 | 45.3 | 121 | 44.2 | 66.4 |
| | Salt removal rate (%) | 91.4 | 86.4 | 82.3 | 10.5 | 85.3 | 80.1 |
| | Contact angle (°) | 34 | 33 | 23 | 8 | 39 | 27 |
| Rate of change in salt removal rate (%) | | −7.2 | −7.1 | −6.4 | −83.1 | −8.8 | −17.5 |
| Rate of change in contact angle (°) | | −6 | −5 | −10 | −35 | −5 | −20 |

TABLE 5

| | Classification | Comparative Example 1 | Comparative Example 2 | Comparative Example 3 | Comparative Example 4 | Comparative Example 5 |
|---|---|---|---|---|---|---|
| First solution | Chemical Formula 1 (n = 2, wt %) | — | 1 | 1 | 1 | — |
| | Chemical Formula 2 (n = 3, wt %) | — | — | — | — | 1 |
| | Second amine-based compound (wt %) | 0.5 | — | 0.5 | — | — |
| | Phenol-based compound (wt %) | 0.35 | 0.35 | — | — | — |
| Weight ratio of first and second amine-based compounds | | — | — | 1:0.5 | — | — |
| Weight ratio of first amine-based compound and phenol-based compound | | — | 1:0.35 | — | — | — |

TABLE 5-continued

| Classification | | Comparative Example 1 | Comparative Example 2 | Comparative Example 3 | Comparative Example 4 | Comparative Example 5 |
|---|---|---|---|---|---|---|
| Second solution | H$_2$SO$_4$ (concentration in %) | — | — | — | — | — |
| | NaOH (concentration in %) | 0.15 | 0.15 | 0.15 | 0.15 | 0.15 |
| Initial | Flow rate (GFD) | 20.2 | 36.9 | 21.1 | 20.6 | 24.2 |
| | Salt removal rate (%) | 87.6 | 87.9 | 98.8 | 96.3 | 98.9 |
| | Contact angle (°) | 48 | 51 | 54 | 54 | 55 |
| 30 days later | Flow rate (GFD) | 199 | 53 | 28.6 | 46.5 | 36.5 |
| | Salt removal rate (%) | 6.4 | 74.3 | 93.3 | 83.8 | 80.5 |
| | Contact angle (°) | 5 | 39 | 37 | 41 | 43 |
| Rate of change in salt removal rate (%) | | −81.2 | −13.6 | −5.5 | −12.5 | −18.4 |
| Rate of change in contact angle (°) | | −43 | −12 | −17 | −13 | −12 |

TABLE 6

| Classification | | Comparative Example 6 | Comparative Example 7 | Comparative Example 8 |
|---|---|---|---|---|
| First solution | Chemical Formula 1 (n = 2, wt %) | — | 1 | 1 |
| | Chemical Formula 2 (n = 3, wt %) | — | — | — |
| | Second amine-based compound (wt %) | 0.5 | 0.5 | 0.5 |
| | Phenol-based compound (wt %) | — | 0.35 | — |
| Weight ratio of first and second amine-based compounds | | — | 1:0.5 | 1:0.5 |
| Weight ratio of first amine-based compound and phenol-based compound | | — | 1:0.35 | — |
| Second solution | H$_2$SO$_4$ (concentration in %) | — | — | — |
| | NaOH (concentration in %) | 0.15 | — | — |
| Initial | Flow rate (GFD) | 31.2 | 21.3 | 18.8 |
| | Salt removal rate (%) | 97.5 | 99 | 99.2 |
| | Contact angle (°) | 43 | 53 | 55 |
| 30 days later | Flow rate (GFD) | 205 | 26.2 | 24.4 |
| | Salt removal rate (%) | 3.3 | 92.2 | 97.6 |
| | Contact angle (°) | 7 | 47 | 52 |
| Rate of change in salt removal rate (%) | | −94.2 | −6.8 | −1.6 |
| Rate of change in contact angle (°) | | −36 | −6 | −3 |

As can be seen from Table 1 to Table 6, the nanomembranes according to the present invention had excellent acid resistance that they did not lose their function as a separation membrane even when immersed in 15 wt % sulfuric acid for a long period of time of 30 days or more, and, as a rate of change of no more than 10% was confirmed, maintained the salt removal rate.

In addition, it can be seen that the nanomembranes of the present invention were superior to the nanomembranes not satisfying the conditions, compositions, and the like of the present invention in terms of all of the initial flow rate, the initial salt removal rate, the flow rate after 30 days of immersion in sulfuric acid, and the salt removal rate after 30 days of immersion in sulfuric acid.

In addition, among the nanomembranes of the present invention, it was found that the lower the initial contact angle, since the level of hydrophilization was higher, the effect of improving the flow rate was more significant, and that the lower the rate of change in contact angle, since acid hydrolysis was suppressed to a greater extent, the effect of improving acid resistance was more significant.

The invention claimed is:

1. A method of producing an acid-resistant nanomembrane with an improved flow rate, the method comprising:
   immersing a porous support in a first solution, wherein the first solution contains a first amine-based compound represented by Chemical Formula 1, a second amine-based compound, and a phenol-based compound;
   forming a polyamide layer on the surface of the immersed porous support by treating the porous support with a second solution containing an acid halide compound; and
   subjecting the porous support, on which the polyamide layer has been formed, to hydrophilization:

[Chemical Formula 1]

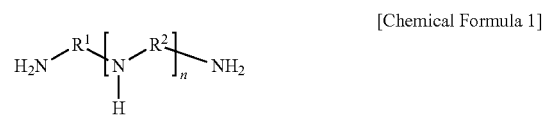

wherein R$^1$ and R$^2$ are each independently a C$_1$-C$_{10}$ alkylene group, and n is an integer of 1 to 100,
the first solution comprises the first amine-based compound and the second amine-based compound in a weight ratio of 1:0.04 to 1:2, and the first amine-based compound and the phenol-based compound in a weight ratio of 1:0.02 to 1:1,
the second amine-based compound includes one or more selected from the group consisting of m-phenylenediamine, and piperazine,
the phenol-based compound includes one or more selected from the group consisting of pyrocatechol, resorcinol, hydroquinone, pyrogallol, and phloroglucinol,
the acid-resistant nanomembrane has a flow rate of 25 GFD or more, and a salt removal rate of 90% or more at 25° C. and 75 psi, and
the acid-resistant nanomembrane has a flow rate of 30 GFD, or more and a salt removal rate of 85% or more at 25° C. and 75 psi when immersed in a 15 wt. % aqueous sulfuric acid solution for 30 days.

2. The method of claim 1, wherein, in Chemical Formula 1, $R^1$ and $R^2$ are each independently a $C_2$-$C_6$ linear alkylene group or a $C_2$-$C_6$ branched alkylene group, and n is an integer of 1 to 10.

3. The method of claim 1, wherein the first solution includes a hydrophilic polymer in an amount of 0.4 part by weight to 40 parts by weight based on 100 parts by weight of the first amine-based compound, wherein the hydrophilic polymer includes one or more selected from the group consisting of polyvinylpyrrolidone, polyethylene glycol, and polyvinyl alcohol.

4. The method of claim 1, wherein the acid halide compound includes one or more selected from among isophthaloyl chloride, trimesoyl chloride, and terephthaloyl chloride.

5. The method of claim 1, wherein the hydrophilization is carried out using a hydrophilization solution comprising an acid, base, salt or a combination thereof at a total concentration of 0.01 wt. % to 2 wt. %.

6. The method of claim 5, wherein the acid, base, or salt is one or more selected from the group consisting of potassium hydroxide, calcium hydroxide, magnesium hydroxide, sodium hydroxide, sulfuric acid, sodium sulfate, sodium sulfite, and sodium bicarbonate.

7. The method of claim 1, wherein the hydrophilization is carried out at 10° C. to 90° C. for 0.1 minute to 5 minutes.

8. The method of claim 1, wherein the porous support includes a nonwoven fabric and a porous polymer layer, wherein the porous polymer layer has an average thickness of 10 μm to 200 μm and is formed to include one or more selected from the group consisting of polysulfone, polyethersulfone, polyimide, polypropylene, and polyvinylidene fluoride.

9. An acid-resistant nanomembrane with an improved flow rate, the acid-resistant nanomembrane comprising:
   a porous support; and
   a polyamide layer, which is provided on the surface of the porous support and formed by the interfacial polymerization between a first solution containing a first amine-based compound, a second amine-based compound, and a phenol-based compound and a second solution containing an acid halide compound, wherein the first amine-based compound includes a compound represented by Chemical Formula 1:

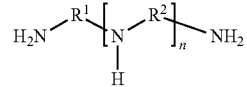

[Chemical Formula 1]

wherein $R^1$ and $R^2$ are each independently a $C_1$-$C_{10}$ alkylene group, and n is an integer of 1 to 100, wherein the polyamide layer has a hydrophilically modified surface the first solution comprises the first amine-based compound and the second amine-based compound in a weight ratio of 1:0.04 to 1:2, and the first amine-based compound and the phenol-based compound in a weight ratio of 1:0.02 to 1:1, the second amine-based compound includes one or more selected from the group consisting of m-phenylenediamine and piperazine, the phenol-based compound includes one or more selected from the group consisting of pyrocatechol, resorcinol, hydroquinone, pyrogallol, and phloroglucinol, the acid-resistant nanomembrane has a flow rate of 25 GFD or more, and a salt removal rate of 90% or more at 25° C. and 75 psi, and the acid-resistant nanomembrane has a flow rate of 30 GFD, or more and a salt removal rate of 85% or more at 25° C. and 75 psi when immersed in a 15 wt. % aqueous sulfuric acid solution for 30 days.

10. The acid-resistant nanomembrane of claim 9, wherein the polyamide layer has an average thickness of 0.05 μm to 1 μm, and the porous support includes a nonwoven fabric having an average thickness of 30 μm to 300 μm and a porous polymer layer having an average thickness of 10 μm to 200 μm,
   wherein the porous polymer layer is formed to include one or more selected from the group consisting of polysulfone, polyethersulfone, polyimide, polypropylene, and polyvinylidene fluoride.

11. A membrane module, comprising the acid-resistant nanomembrane of claim 9.

* * * * *